H. M. BROWER.
SAFETY LOCK FOR AUTOMOBILES.
APPLICATION FILED AUG. 11, 1919.
1,383,904.
Patented July 5, 1921.
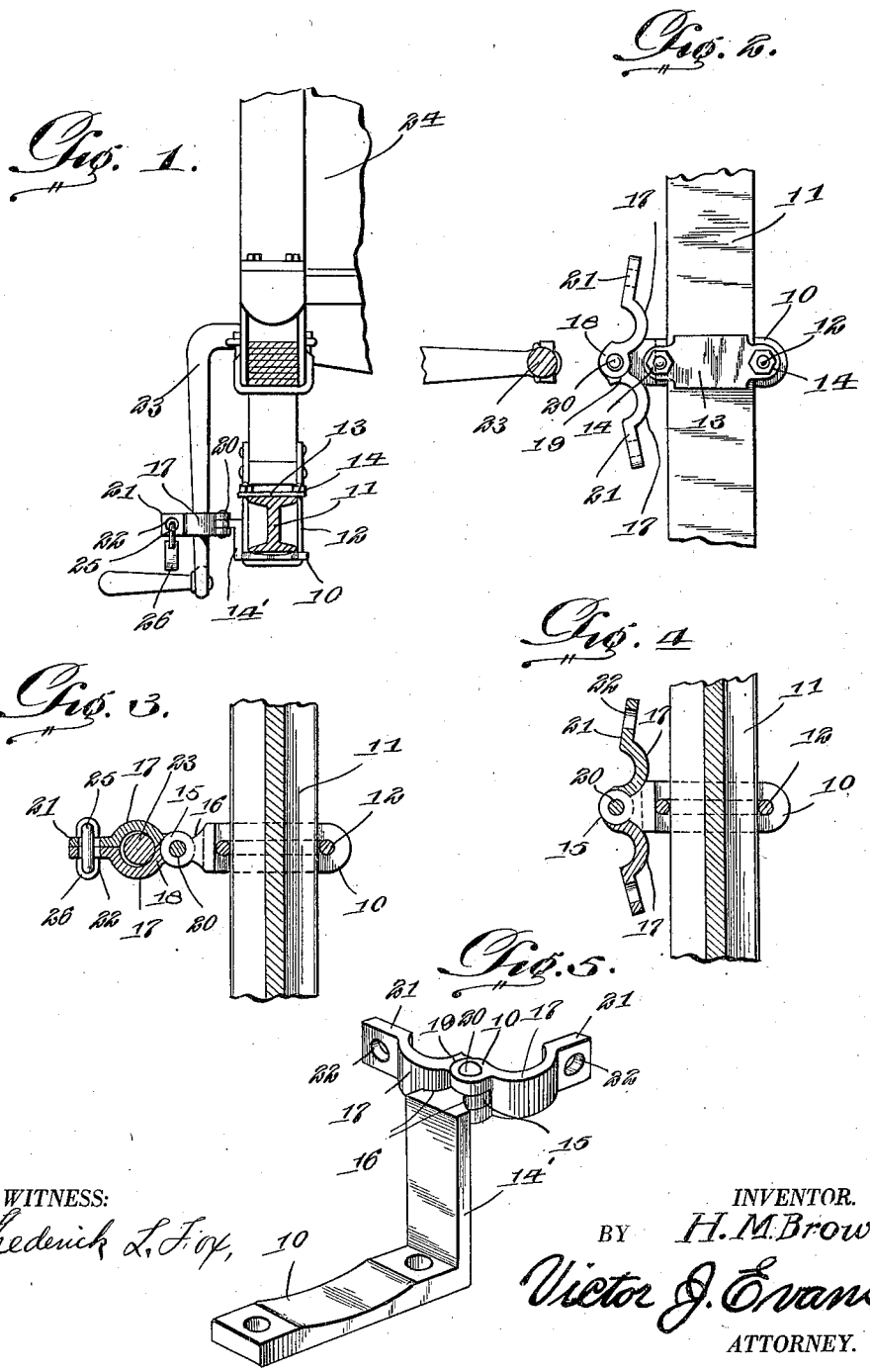
WITNESS:
Frederick L. Fox
INVENTOR.
BY H. M. Brower.
Victor J. Evans.
ATTORNEY.

UNITED STATES PATENT OFFICE.

HARRY M. BROWER, OF FREEHOLD, NEW JERSEY.

SAFETY-LOCK FOR AUTOMOBILES.

1,383,904.  Specification of Letters Patent.  Patented July 5, 1921.

Application filed August 11, 1919. Serial No. 316,707.

*To all whom it may concern:*

Be it known that I, HARRY M. BROWER, a citizen of the United States, residing at Freehold, in the county of Monmouth and State of New Jersey, have invented new and useful Improvements in Safety-Locks for Automobiles, of which the following is a specification.

The present invention has reference to a simple means for locking the cranking shaft of an automobile to the chassis thereof to prevent surreptitious tampering with the car or the stealing thereof.

The primary object of the invention is to produce an extremely simple means for this purpose, comprising a bracket which may be readily secured to the front axle of the car, said bracket having at one of its ends two pivoted jaw members, designed when not in use to be swung into the channel on the outer face of the axle and when in such position to engage with the bracket with sufficient friction to prevent the accidental swinging thereof in an outward direction, said jaws when brought to operative position designed to encircle the crank of the machine, after the latter has been moved inwardly to clutching position with the engine shaft, removable means, such as a clasp lock being provided for securing the jaws, and consequently preventing the turning of the crank and retaining the crank in locked position with the engine shaft.

It is a still further object of the invention to produce a locking means of this character which may be easily, quickly and securely attached, which may be cheaply manufactured and marketed, and which will perform the functions for which it is devised with accuracy and with certainty.

Figure 1 is a view illustrating the application of the improvement.

Fig. 2 is a similar view showing the device in inoperative position.

Fig. 3 is a horizontal sectional view through the device as illustrated in Fig. 1.

Fig. 4 is a longitudinal sectional view through the device as illustrated in Fig. 2.

Fig. 5 is a perspective view of the improvement, looking toward the rear thereof, one of the jaws being in its open position and the other jaw in its closed position.

My improvement includes an L-shaped bracket, the lower arm 10 of which being arranged on the under face of the I beam that forms the front axle 11 of an ordinary Ford or other class of automobiles. The member 10 may be termed the base of the bracket, the same having its upper face preferably centrally concaved and being provided, adjacent to its ends with openings through which pass the parallel arms of a U-bolt 12. On the top of the axle 11 is a transversely arranged plate 13 that has openings therein through which the arms of the U-bolt pass. The outer ends of the arms of the said U-bolt are threaded and are engaged by nuts 14 which clamp the bracket on the axle. Suitable locking means may be employed for holding the nuts against accidental movement on the U-bolt, and if desired suitable means may be also employed for locking the said arms of the U-bolt to the plate 13.

The outer arm of the angle bracket is indicated by the numeral 14' and is of a less length than the arm or base portion 10, so that the outer end of the arm 14' terminates approximately centrally of the outer channel of the axle 11. The upper end of the arm 14' is provided with an outstanding rounded ear 15, the said ear having a central opening therethrough, and angle shoulders 16 are provided between the inner end of the ear 15 and the sides of the arm 14 of the bracket. The jaw members are each of a similar construction, each including a member which has a semi-circular body portion 17, the latter being formed at one of its ends with an inturned rounded ear 18 and a concaved shoulder 19 between the ear and the terminal of the body proper. The ears each have a central opening therethrough designed to aline with the opening in the ear 15 of the bracket. One of the ears of one of the bracket members underlies the ear 15 of the bracket, the other ear overlying the said ear of the bracket, and a pivot member 20 passes through the alining openings in the respective ears. This pivot, of course, comprises a member which is round in cross section and which has both of its ends headed, one of the said heads being provided by mashing and spreading one of the ends of the pivot to enlarge the same. The heads exert a sufficient pressure upon the ears of the jaw members to prevent the free turning thereof and to also hold the said jaws against the shoulders 16 provided at the terminal of the ear 15 with the arm 14 of the bracket. By this arrangement, when the device is in inoperative position the ears are spread away from each other and contacting with the shoulders 16 are received in the outer channel of the axle 11.

On the outer ends of the body portions of the jaw members are outstanding portions 21 each having therethrough an opening 22 which alines when the jaw members are brought together. When the jaw members are in their open position an inward pressure is exerted upon the crank 23 of the automobile 24, so that the clutch head thereof engages the clutch head on the axle of the motor. The jaws are then swung so that they surround the crank axle 22, and the outwardly extending portions 21 being brought together receive through openings 22 thereof the hasp 25 of a lock 26. This arrangement not only prevents the turning of the crank but locks the crank to the engine shaft, and positively prevents the actuation of the crank by unauthorized persons or the surreptitious theft of the car.

Having thus described the invention, what is claimed as new, is:—

In a means for locking the starting crank of an automobile to the front axle of the machine, an angle bracket designed to have one of its arms arranged against the front of the axle and its other arm arranged beneath the axle, the first mentioned arm being of a length less than that of the height of the axle, and the last mentioned arm being of a length greater than the width of the axle, means surrounding the axle, passing through the last mentioned arm of the bracket and contacting with the inner face of the first mentioned arm for securing the bracket on the axle, an outstanding rounded ear having inwardly concaved sides integrally formed at the upper end of the first mentioned arm, jaws having semi-cylindrical body portions, outer straight ends and knuckles on their inner ends at the opposed corners thereof, said knuckles designed for contacting engagement with the opposite faces of the ear, a pivot passing through the knuckles and ear having head portions which frictionally engage with the knuckles for holding the jaws against accidental turning on the ear, and the outer straight portions of the jaws having openings therethrough for the reception of the staple of a lock.

In testimony whereof I affix my signature.

HARRY M. BROWER.